(12) United States Patent
    Choi

(10) Patent No.: US 9,013,560 B2
(45) Date of Patent: Apr. 21, 2015

(54) VIEWING RANGE NOTIFICATION METHOD AND TV RECEIVER FOR IMPLEMENTING THE SAME

(75) Inventor: Hak-Young Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 661 days.

(21) Appl. No.: 13/378,319

(22) PCT Filed: Jan. 8, 2010

(86) PCT No.: PCT/KR2010/000120
§ 371 (c)(1),
(2), (4) Date: Dec. 14, 2011

(87) PCT Pub. No.: WO2010/147281
PCT Pub. Date: Dec. 23, 2010

(65) Prior Publication Data
US 2012/0092466 A1    Apr. 19, 2012

Related U.S. Application Data

(60) Provisional application No. 61/187,642, filed on Jun. 16, 2009.

(51) Int. Cl.
*H04N 13/04* (2006.01)
*H04N 9/47* (2006.01)
*H04N 5/765* (2006.01)
*H04N 9/80* (2006.01)
H04N 21/485 (2011.01)

(52) U.S. Cl.
CPC ........ *H04N 13/0477* (2013.01); *H04N 13/0429* (2013.01); *H04N 13/0475* (2013.01); *H04N 21/485* (2013.01)

(58) Field of Classification Search
None
See application file for complete search history.

(56) References Cited

U.S. PATENT DOCUMENTS

| | | | |
|---|---|---|---|
| 6,311,141 B1* | 10/2001 | Hazra | 702/150 |
| 2003/0012425 A1 | 1/2003 | Suzuki et al. | |
| 2004/0008251 A1* | 1/2004 | Mashitani et al. | 348/51 |
| 2004/0239517 A1* | 12/2004 | Coley et al. | 340/686.6 |
| 2006/0268987 A1* | 11/2006 | Ha | 375/240.16 |
| 2008/0150936 A1 | 6/2008 | Karman | |

(Continued)

FOREIGN PATENT DOCUMENTS

| | | |
|---|---|---|
| EP | 0 656 730 A1 | 6/1995 |
| JP | 2000-152285 A | 5/2000 |

(Continued)

*Primary Examiner* — Hung Dang
(74) *Attorney, Agent, or Firm* — Birch, Stewart, Kolasch & Birch, LLP

(57) ABSTRACT

The present invention relates to a viewing range notification method for guiding a viewer to watch TV within an optimal viewing range by providing a guide message for advising the viewer to change his/her position if the viewer is out of the optimal viewing range and a TV receiver appropriate for implementing the guiding method. According to the present invention, the viewing range guiding method can be implemented by a three-dimensional TV receiver. The three-dimensional TV receiver determines whether the viewing range of the user is farther than a predetermined distance, and whether the viewing angle is within the predetermined angular range. Then, if the viewing range is nearer than the predetermined distance or the viewing angle is not within the predetermined angular range, the three-dimensional TV receiver provides a guide message for changing the viewing position.

8 Claims, 8 Drawing Sheets

(56) References Cited

U.S. PATENT DOCUMENTS

| | | |
|---|---|---|
| 2009/0058845 A1* | 3/2009 | Fukuda et al. ............... 345/214 |
| 2009/0096863 A1* | 4/2009 | Kim et al. .................... 348/42 |
| 2009/0244267 A1* | 10/2009 | Yuan et al. .................... 348/51 |
| 2009/0268095 A1* | 10/2009 | Hoshino et al. ............... 348/607 |
| 2010/0259603 A1* | 10/2010 | Mihara et al. ................. 348/53 |

FOREIGN PATENT DOCUMENTS

| | | |
|---|---|---|
| JP | 2004-298289 A | 10/2004 |
| KR | 10-0201998 B1 | 6/1999 |
| KR | 10-2004-0023088 A | 3/2004 |
| KR | 10-2007-0011291 A | 1/2007 |
| WO | WO 94/20875 A2 | 9/1994 |

* cited by examiner (a)  (b)

VIEWING RANGE NOTIFICATION METHOD AND TV RECEIVER FOR IMPLEMENTING THE SAME

CROSS REFERENCE TO RELATED APPLICATIONS

This application is the National Phase of PCT/KR2010/000120 filed on Jan. 8, 2010, which claims priority under 35 U.S.C. §119(e) to U.S. Provisional Application No. 61/187,642 filed on Jun. 16, 2009, all of which are hereby expressly incorporated by reference into the present application.

TECHNICAL FIELD

The present disclosure relates to a display device, and more particularly, to a three-dimensional (3D) display device. The present disclosure also relates to a user interface method in a 3D display device.

BACKGROUND ART

Generally, as a screen becomes wider, a viewer's angle of view can be implemented a various ways. Furthermore, the viewer can focus on an entire image, and can concentrate on the screen with a high sense of realism. Accordingly, demands for a large display device continuously increases. As techniques for manufacturing a large display device are developed, large and flat type display devices are being rapidly presented onto the market.

In order to have an optimal concentration degree at a wider viewing angle in a TV receiver, a viewer has to move closer to the television screen. However, due to the recognition characteristics of human eyes, it is not preferable for the viewer to come too close to the screen. That is, when the viewer approaches to the television too closely, each pixel inside an image may be individually perceived. This may cause the viewer to feel uncomfortable when viewing images and thus result in fatigue.

The reasons for this may be explained in reference to a contrast sensitivity function with respect to a spatial frequency. For instance, as shown in FIG. 1, experiments were conducted to determine whether human eyes could recognize stripes in a state that a density of the stripes was varied within a viewing angle of 1°. According to the experimental results, it has been reported that the human eyes have certain characteristics as shown in the graph of FIG. 2 (Contrast Sensitivity of the Human Eye and its Effects on Image Quality, Peter G. J. Barten, SPIE Press Monograph Vol. PM72, 1999). More concretely, when about 8 stripes are repeatedly implemented within a viewing angle of 1°, the human eyes can best recognize the patterns. However, when the number of the stripes increases, a recognition degree by the human eyes is decreased. If the number of the stripes increases to about 60, the human eyes cannot recognize the stripes as being black lines, but can only recognize such stripes as being gray lines. According to the experimental results, when the spatial frequency is more than 60 cpd (cycles per degree), the human eyes cannot recognize an image clearly, but can only recognize the image as a soft or blurred image. Therefore, in order to allow the viewer to comfortably view an image with minimal fatigue, the spatial frequency should be set as 60 cpd.

Also, the viewer should watch television within an optimal viewing range where a viewing angle can be increased and an image can be recognized with ease. Especially, in case of stereoscopic 3D TV images, it is more important for the viewer to watch TV within an optimal viewing range.

For a 3D TV receiver using polarized glasses, in addition to the distance between the viewer and the screen important, also the vertical viewing angle are important factors. For instance, in case of a 2D LCD TV, a vertical viewing angle is about 160° or more. On the other hand, in case of a polarized glassed type 3D LCD TV, a vertical viewing angle is merely about 10° due to use of a retardation film for generating polarized light with respect to the right and left images. If the viewer watches TV outside of the viewing angle, an image may be erroneously recognized as a white blurred image having a very low gamma value, or as a black image having a very high gamma value.

Therefore, in order for the viewer to more properly watch 3D images provided from a 3D TV receiver with optimal contrast and brightness with minimal fatigue, the viewer has to be within the optimal viewing range and also within the optimal viewing angle. However, it is not easy for the viewer to check his or her current position and to adjust his position while viewing television. Furthermore, while selecting a proper position, the viewer may not concentrate on the program being shown, or may such position re-alignment can cause inconvenience. For example, the elderly or children may experience difficulties in deciding and moving into the proper viewing position.

DISCLOSURE OF THE INVENTION

Therefore, an object of the present disclosure is to provide a viewing range notification method capable of allowing a viewer to watch television within an optimal viewing range, by providing a guide message for guiding the viewer to change a current position if the viewer is out of the optimal viewing range.

Another object of the present disclosure is to provide a TV receiver for implementing the viewing range notification method.

The viewing range notification method of the present disclosure may be implemented in a three-dimensional (3D) TV receiver. To achieve these and other advantages and in accordance with the purpose of the present invention, as embodied and broadly described herein, there is provided a viewing range notification method in a three-dimensional (3D) TV receiver, the method including: determining whether a viewing distance of a user (a viewer) is farther or nearer than a predetermined distance, and whether a viewing angle is within a predetermined angular range; and providing a guide message for advising the user to change a viewing position if the viewing distance is farther or nearer than the predetermined distance, or if the viewing angle is out of the predetermined angular range.

In the step of determining the viewing distance and the viewing angle, the 3D TV receiver may capture a front side by a plurality of image sensors, determine the viewer's position based on the captured image, and then calculate the viewing distance and the viewing angle. In one embodiment, the viewer's position may be determined as a position of the viewer's glasses for the TV receiver.

In a modified embodiment, in the step of determining the viewing distance and the viewing angle, the 3D TV receiver may receive ultrasonic signals transmitted from the viewer's glasses for the TV receiver with using a plurality of ultrasonic receivers, and calculate differences of times taken for the supersonic signals to be transmitted to the plurality of ultrasonic receivers (transmission times). Then, the 3D TV receiver may determine the viewer's position based on the differences of transmission times, and may calculate the viewing distance and the viewing angle.

In another modified embodiment, in the step of determining the viewing distance and the viewing angle, the 3D TV receiver may transmit source ultrasonic signals, and then receive, with using a plurality of ultrasonic receivers, the source ultrasonic signals re-transmitted from the user's glasses for the TV receiver. The 3D TV receiver may calculate time taken for each ultrasonic signal to be transmitted and then received (return time), determine the viewer's position based on the calculated return time, and calculate the viewing distance and the viewing angle.

To achieve these and other advantages and in accordance with the purpose of the present invention, as embodied and broadly described herein, a TV receiver includes a signal receiving unit, a controller, a message screen generator and a signal coupling unit. The signal receiving unit may be configured to restore an image signal by receiving a broadcasting signal. The controller may be configured to determine whether a viewing distance is farther than a reference distance, and whether a viewing angle is within a reference angular range. The message screen generator may be configured to generate a guide message screen for changing a viewing position, if the viewing distance is nearer than the reference distance, or if the viewing angle is out of the reference angular range. The signal coupling unit may be configured to couple the guide message screen to the image signal.

The controller may include a viewing range determining means configured to determine the viewing distance and the viewing angle, and a memory configured to store therein the reference distance and the reference angular range.

In one embodiment, the TV receiver may be further provided with a plurality of image sensors configured to capture the front side of the TV receiver. In this case, the viewing range determining means may be configured to determine a viewer's position based on images captured by the plurality of image sensors, and to calculate the viewing distance and the viewing angle.

In another embodiment, the TV receiver may be further provided with a plurality of ultrasonic receivers configured to receive ultrasonic signals transmitted from a viewer's glasses for the TV receiver. The viewing range determining means may be configured to determine the viewer's position based on differences of times taken for ultrasonic signals transmitted from the plurality of ultrasonic receivers to be received again by the plurality of ultrasonic receivers. And, the viewing range determining means may calculate the viewing distance and the viewing angle.

In still another embodiment, the TV receiver may be further provided with a ultrasonic transmitter configured to transmit source ultrasonic signals, and a plurality of ultrasonic receivers configured to receive the ultrasonic signals re-transmitted from a ultrasonic repeater of the viewer's glasses for the TV receiver. In this case, the viewing range determining means may be configured to determine the viewer's position based on time taken for ultrasonic signals transmitted from the plurality of ultrasonic receivers to be received again by the plurality of ultrasonic receivers. And, the viewing range determining means may be configured to calculate the viewing distance and the viewing angle.

Effects of the Invention

Firstly, the TV receiver may provide a guide message for guiding the viewer to change his or her current position if the viewer is not within an optimal viewing distance and viewing angle. This may allow the viewer to watch TV within an optimal viewing distance and an optimal viewing angle. Therefore, the viewer can watch 3D images provided from the 3D TV receiver at an optimal contrast and brightness with minimal fatigue. Furthermore, the viewer can acquire a proper viewing position based on a guide message provided from the TV receiver. This may minimize the viewer having to lose concentration due to the selection for an optimal position while watching TV, and may minimize user inconvenience. Especially, degradation in eyesight can be minimized for the elderly or children having a relatively low recognition capability.

BRIEF DESCRIPTION OF THE DRAWINGS

Hereinafter, features of some embodiments of the present disclosure will be explained in more detail with reference to the attached drawings. The same components will be provided with the same reference numerals for convenience, and the some explanations will be omitted merely for the sake of brevity.

MODES FOR CARRYING OUT THE PREFERRED EMBODIMENTS

Figure 1:
FIG. 1 is a view showing sample images for testing a contrast sensitivity function.
Figure 1:
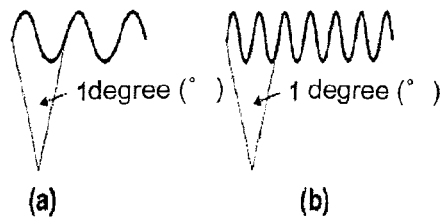
Figure 2:
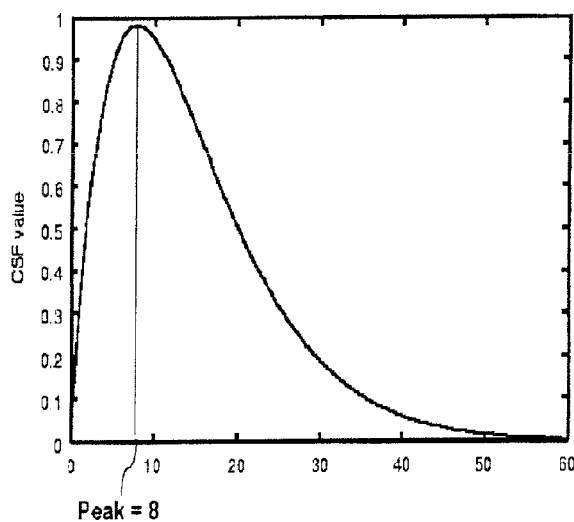
FIG. 2 is a graph showing a contrast sensitivity function with respect to a spatial frequency.
Figure 3:
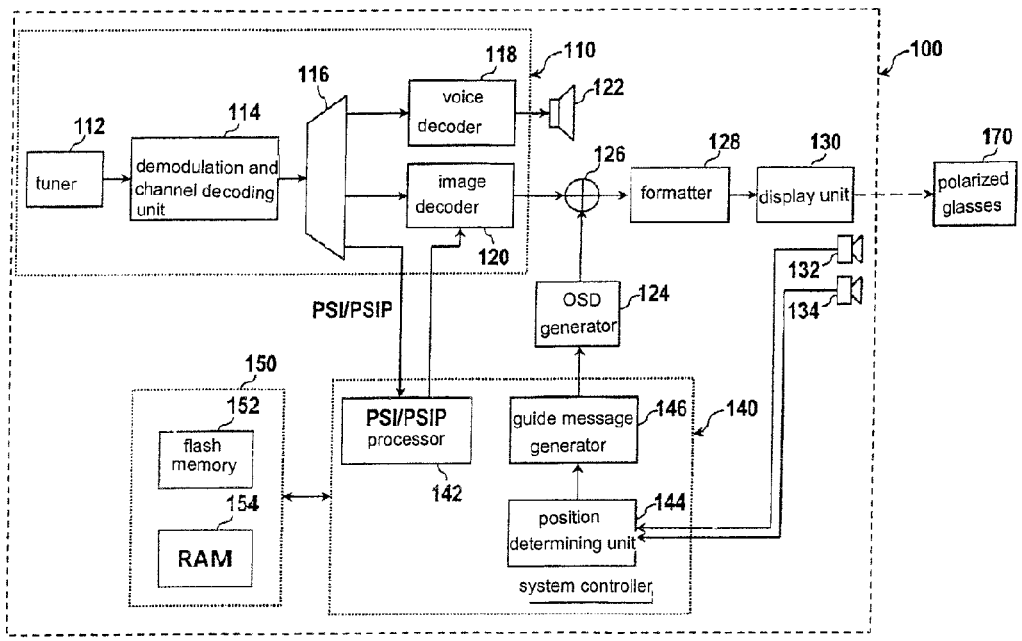
FIG. 3 is a block diagram of a TV receiver system according to a first embodiment of the present disclosure.

Referring to FIG. 3, a TV receiver system according to one embodiment of the present disclosure comprises a TV receiver 100 and polarized glasses 170. The TV receiver 100 is configured to receive a 3D broadcasting signal through terrestrial airwaves or a cable TV network, and to display a 3D image corresponding to the 3D broadcasting signal in a stereoscopic manner. According to some embodiments of the present disclosure, the TV receiver 100 synthesizes a left image and a right image in a horizontal direction, i.e., in an interleaving manner in the unit of lines, so as to format the left image and the right image which constitute a pair of stereoscopic images. Then, the TV receiver 100 displays the synthesized images on a display panel. A polarizing filter having polarizing directions different from each other by 90° is attached to the display panel of the TV receiver 100, thereby polarizing a left image and a right image in different directions. Polarized glasses 170 are provided with a polarization pattern in the same manner as the polarizing filter of the display panel. This allows only a left image to be input to a viewer's left eye, and allows only a right image to be input to a viewer's right eye.

The signal receiving unit 110 of the TV receiver 100 is configured to receive a broadcasting signal and to restore an image signal. The signal receiving unit 110 includes a tuner 112, a demodulation and channel decoding unit 114, a transport inverse multiplexer 116, a voice decoder 118 and an image decoder 120.

More concretely, the tuner 112 is configured to output a broadcasting signal of a channel selected from a plurality of broadcasting signals. The demodulation and channel decoding unit 114 is configured to demodulate the broadcasting signal outputted from the tuner 112, and to output a transport stream (TS) after performing an error correction decoding with respect to the demodulated broadcasting signal. The transport inverse multiplexer 116 is configured to inversely-multiplex the TS to separate video PES and audio PES from each other, and to extract PSI/PSIP information. A packet release unit (not shown) is configured to restore video ES and audio ES by releasing packets with respect to video PES and audio PES.

The voice decoder is configured to output an audio bit stream by decoding audio ES. The audio bit stream is converted into an analogue voice signal by a digital-analogue converter (not shown), is amplified by an amplifier (not shown), and then is output through a speaker. The image decoder 120 is configured to extract a video bit stream by decoding video ES. And, the image decoder 120 is configured to output a left image signal and a right image signal for implementing a stereoscopic 3D image by decoding a video bit stream.

An on screen display (OSD) generator 124 is configured to generate an OSD signal with respect to an OSD image to be displayed in an overlapped state with a broadcasting image, under control of a system controller 140. In one embodiment, the OSD image consists of a pair of right and left images for displaying a stereoscopic 3D image in the same manner as a broadcasting image. Especially, in the present disclosure, the OSD generator 124 may generate an OSD signal with respect to a guide message for advising a viewer to change the viewing position if a viewing distance or a viewing angle is not within an optimal range. A mixer 126 is configured to synthesize an OSD image to a broadcasting image.

A formatter 128 is configured to compare frame times with respect to right and left image signals, and is configured to perform formatting such that right and left images temporarily consistent with each other are displayed on a display unit 130 in pair. In the preferred embodiment, the formatting is performed by synthesizing right and left images which constitute a pair of stereoscopic images to each other in an interleaving manner in a horizontal direction.

Figure 4:
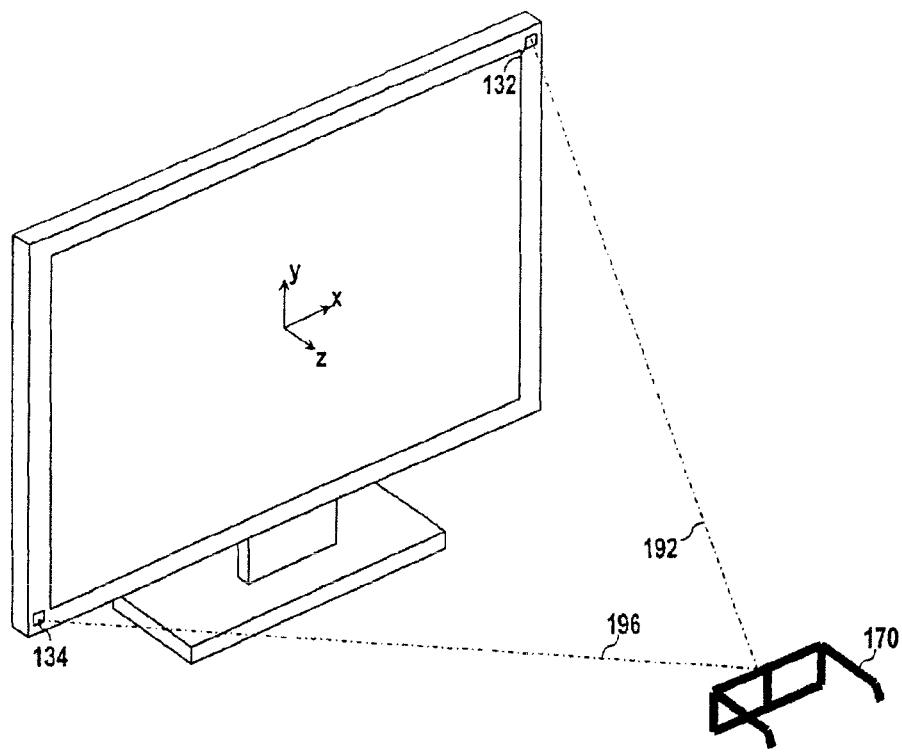
FIG. 4 is a perspective view showing installation positions of image sensors of FIG. 3.

The display unit 130 is provided with a liquid crystal (LC) panel, and a panel driving circuit configured to convert right and left image signals to signals appropriate for being displayed on the LC panel, and configured to generate a control signal such as each type of timing control signal and driving signal. Two image sensors 132 and 134 are installed on a front surface of a frame which accommodates the LC panel therein. As shown in FIG. 4, the image sensors 132 and 134 are preferably installed near edges in a diagonal direction on the front surface of the frame which accommodates the LC panel therein. The image sensors 132 and 134 are configured to capture the front side of the TV receiver 100, and to provide the captured still image to the system controller 140 so that the system controller 140 can determine a viewer's position.

A PSI/PSIP processor 142 of the system controller 140 receives PSI/PSIP information from the transport inverse multiplexer 116, and performs parsing with respect to the received PSI/PSIP information. Then, the PSI/PSIP processor 142 stores the parsed PSI/PSIP information in a memory 150 or a register so that a broadcasting signal can be decoded and a broadcasting play can be performed based on the stored information. A position determining unit 144 is configured to sense a position of the polarized glasses 170 from images captured by the image sensors 132 and 134, and to determine a viewing position and a viewing angle based on the position of the polarized glasses 170. A guide message generator 146 is configured to determine whether the viewing range or the viewing angle is within an optimal viewing range. If the viewing range or the viewing angle is out of the optimal viewing range, the guide message generator 146 generates a guide message to advise the viewer to change his viewing position, and provides the generated guide message to the OSD generator 124.

A flash memory 152 of the memory 150 is configured to store therein programs required for a system operation, and operation setting data. Especially, in the present disclosure, the flash memory 152 is configured to store therein data on an optimal viewing distance and an optimal viewing angle determined based on a size and a resolution of an LC panel. And, the flash memory 152 is configured to store therein data on a shape pattern of the polarized glasses 170. A RAM 152 is configured to store therein temporary data occurring during a system operation.

Figure 5:
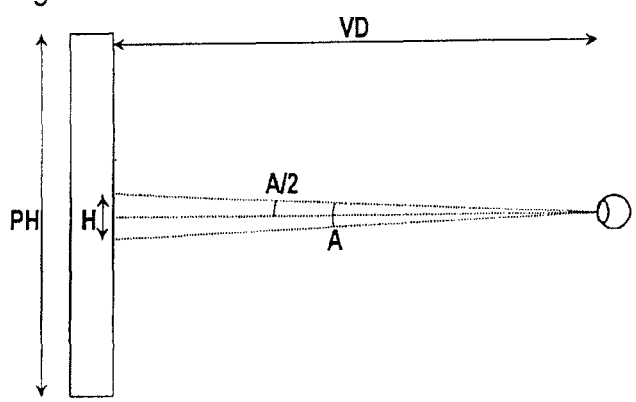
FIG. 5 is a view showing a method for calculating an optimal viewing distance stored in the TV receiver system of FIG. 3.

In the present disclosure, the data on an optimal viewing distance and an optimal viewing angle which is stored in the flash memory 152 is determined as follows. Referring to FIG. 5, it is assumed that 'VD' denotes a viewing distance, 'A' denotes a vertical viewing angle (1°), 'H' denotes a screen height corresponding to the vertical viewing angle (1°). Under this assumption, a relationship therebetween may be expresses as the following equation 1.

$$\tan(A/2) = \frac{0.5H}{VD} \qquad \text{[Equation 1]}$$
$$H = 2 \times VD \times \tan(A/2)$$

Therefore, the number (R) of scan lines disposed within the vertical viewing angle, 1° (A) may be expressed as the following Equation 2.

$$R = VR \times \frac{H}{PH} \quad \text{[Equation 2]}$$
$$= 2 \times VD \times \tan(A/2) \times \frac{VR}{PH}$$

Here, 'PH' denotes a height of a screen, and 'VR' denotes a vertical resolution of a screen. The Equation 2 may be arranged with respect to the viewing distance (VD) as follows.

$$VD = \frac{R \times PH}{2 \times VR \times \tan(A/2)} \quad \text{[Equation 3]}$$

A viewing distance (VD) is assumed to be the optimal viewing distance when the number (R) of scan lines is 60, with the scan lines disposed within the vertical viewing angle 1° (A), which allows the viewer to naturally watch an image without such image being too bright.

For instance, under the assumption that a screen height (PH) is 58.5 and a vertical resolution (VR) of a screen is 1080 in a 42-inch full HD LCD TV, an optimal viewing distance is 1.87 m.

Figure 6:
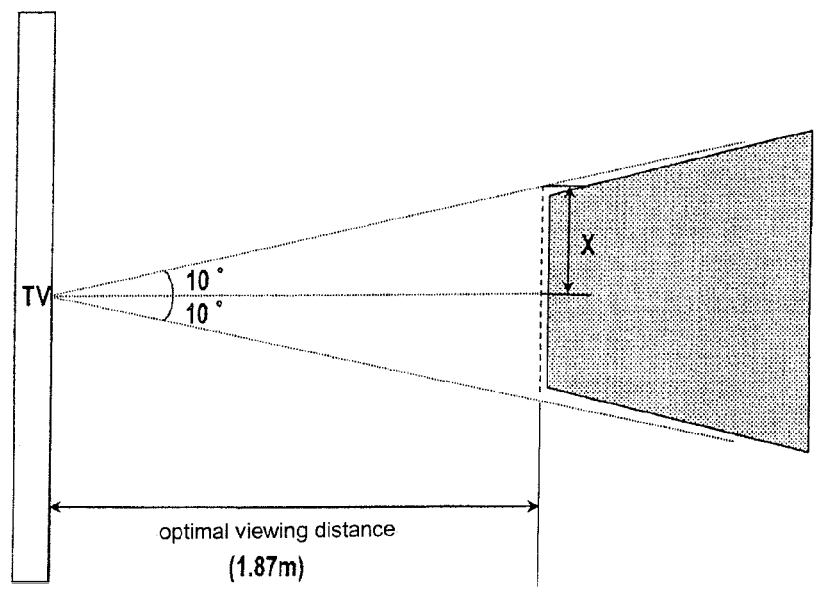
FIG. 6 is a view for explaining an optimal viewing range applied to the TV receiver system of FIG. 3.
Figure 7:
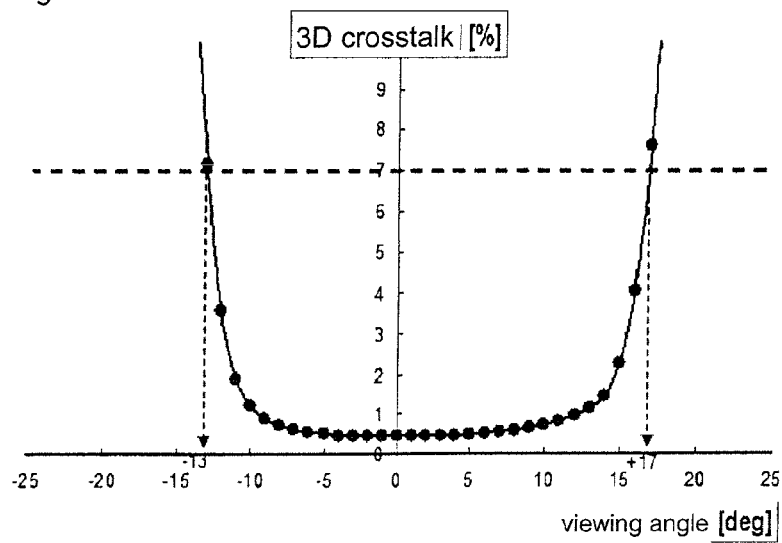
FIG. 7 is a graph showing a relation between a viewing angle and a crosstalk.

In one embodiment, the 3D TV receiver using the polarized glasses 170 has a vertical viewing angle of about 10°. Therefore, as shown in FIG. 6, a vertical viewing angle can be set within a range of 10° in the upper and lower directions. According to experiments by the present inventors, a 3D crosstalk between right and left images was non-linearly changed as the viewing angle is changed. More concretely, as shown in FIG. 7, the present inventors have observed that a 3D crosstalk is negligible when a viewing angle is within about 10°, but the 3D crosstalk becomes large enough to influence the watching of a 3D image when the viewing angle is greater than about 10°.

Therefore, in the 3D TV receiver using the polarized glasses 170, it may be preferable for a viewer to watch TV at a position (a part of FIG. 6 indicated by deviant crease lines) farther than an optimal viewing distance and having a viewing angle of about 10°. Threshold values with respect to an optimal viewing distance and an optimal viewing angle may be variable according to a specification of each TV receiver. In the present embodiment, the flash memory 152 is configured to store therein data on an optimal viewing distance and an optimal viewing angle determined based on a size and a resolution of an LC panel.

Figure 8:
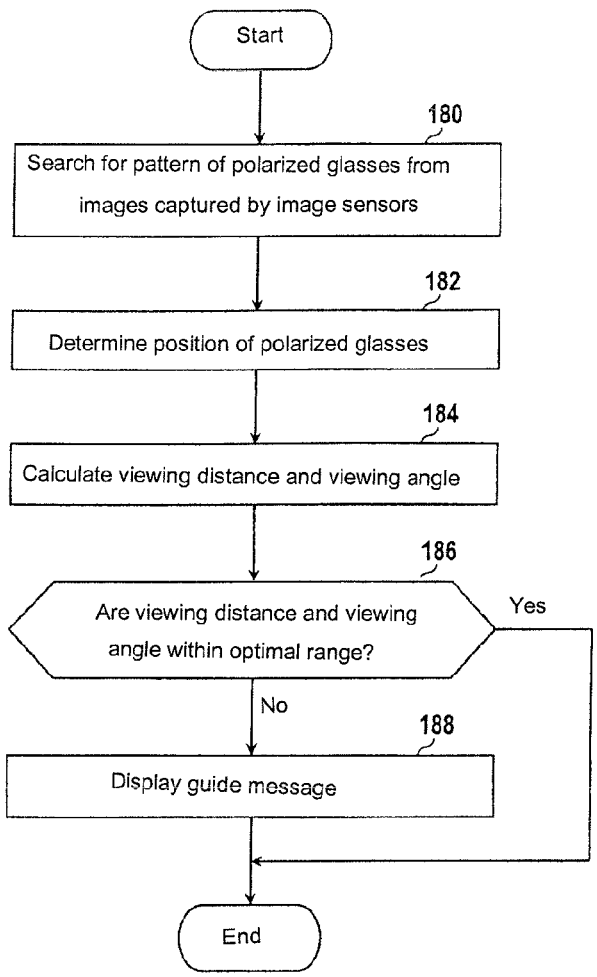
FIG. 8 is a flowchart showing an operation of the TV receiver system of FIG. 3.

FIG. 8 is a flowchart showing processes of notifying a viewing range in the TV receiver system of FIG. 3.

Firstly, the image sensors 132 and 134 disposed on a front surface of the display unit 130 capture the front side of the TV receiver 100. Then, the position determining unit 144 of the system controller 140 searches for a shape pattern of the polarized glasses 170 within images captured by the image sensors 132 and 134, thereby determining a position of the polarized glasses 170 within the images (S180). For instance, the position of the polarized glasses 170 within the images may be determined by comparing the shape pattern of the polarized glasses 170 stored in the flash memory 152, with the images captured by the image sensors 132 and 134 in the unit of a pixel block of a predetermined size, and then by calculating a matching degree by a correlation coefficient. Various types of pattern search methods are already well-known, and can be easily implemented to the concepts described herein as would be understood by those skilled in the art. Therefore, detailed explanations thereof will be omitted herein merely for the sake of brevity.

Then, the position determining unit 144 of the system controller 140 acquires a position of a reference point of the polarized glasses 170 within each image captured by the image sensors 132 and 134, and then determines coordinates of the reference point in a 3D space (S182). The reference point may be a mid-point between the center of a left eye polarizing lens and the center of a right eye polarizing lens.

Figure 9:
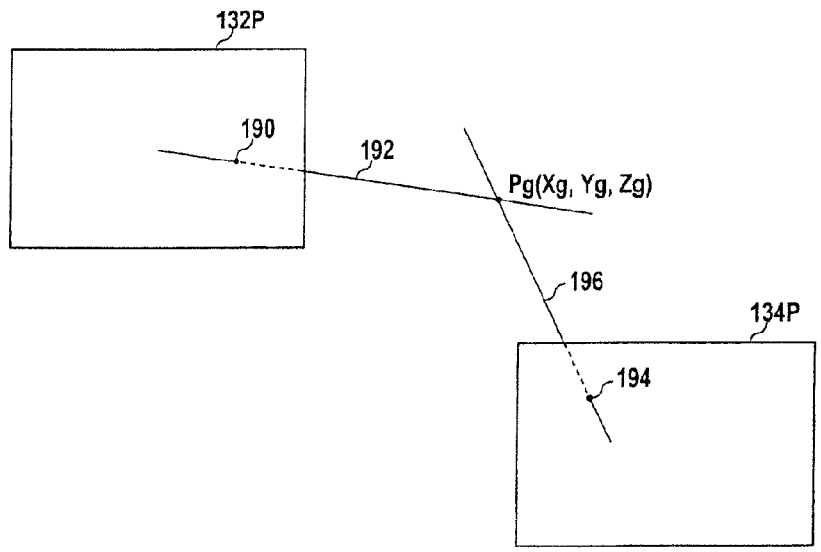
FIG. 9 is a view for explaining a method for determining a position of polarized glasses.

Referring to FIG. 9, the position determining unit 144 determines a position of a pixel 190 corresponding to the reference point within an image 132P captured by the first image sensor 132. Likewise, the position determining unit 144 determines a position of a pixel 194 corresponding to the reference point within an image 134P captured by the second image sensor 134. Then, with respect to the image 132P captured by the first image sensor 132, the position determining unit 144 calculates an equation on a virtual straight line 192 which consists of points for forming an image onto the pixel 190, based on the position of the pixel 190 determined as the reference point. And, with respect to the image 134P captured by the second image sensor 134, the position determining unit 144 calculates an equation on a virtual straight line 196 which consists of points for forming an image onto the pixel 194, based on the position of the pixel 194 determined as the reference point. Then, the position determining unit 144 determines an intersection point of the two straight lines as coordinates (Xg, Yg, Zg) of a reference point (Pg) in a 3D space, i.e., a position of the polarized glasses 170. The intersection point may be determined through simultaneous equations on the two straight lines 192 and 194 in an algebraic manner, or may be determined through iteration in a numerical analysis manner with consideration of computational errors.

Referring back to FIG. 8, in S184, the position determining unit 144 calculates a viewing distance and a viewing angle of a viewer using the polarized glasses 170, based on data on the position of the polarized glasses 170 calculated in S182. Then, the guide message generator 146 determines whether the calculated viewing distance is greater than an optimal viewing distance stored in the flash memory 152, and whether the calculated viewing angle is within an optimal viewing angle stored in the flash memory 152 (S186). If it is determined in S186 that the viewing distance and the viewing angle are within an optimal range, the processes of FIG. 8 are ended. On the other hand, if it is determined in S186 that the viewing distance and the viewing angle are not within an optimal range, the guide message generator 146 generates a guide message for advising the viewer to change the viewing position, and then provides the guide message to the OSD generator 124 so that the guide message can be displayed on an OSD.

For instance, if the viewing distance is nearer than an optimal viewing distance, a guide message such as "Please move away for optimal 3D effect" may be displayed. If the viewing angle is out of an optimal range, a guide message such as "Please move closer for optimal 3D effect" may be displayed.

Figure 10:
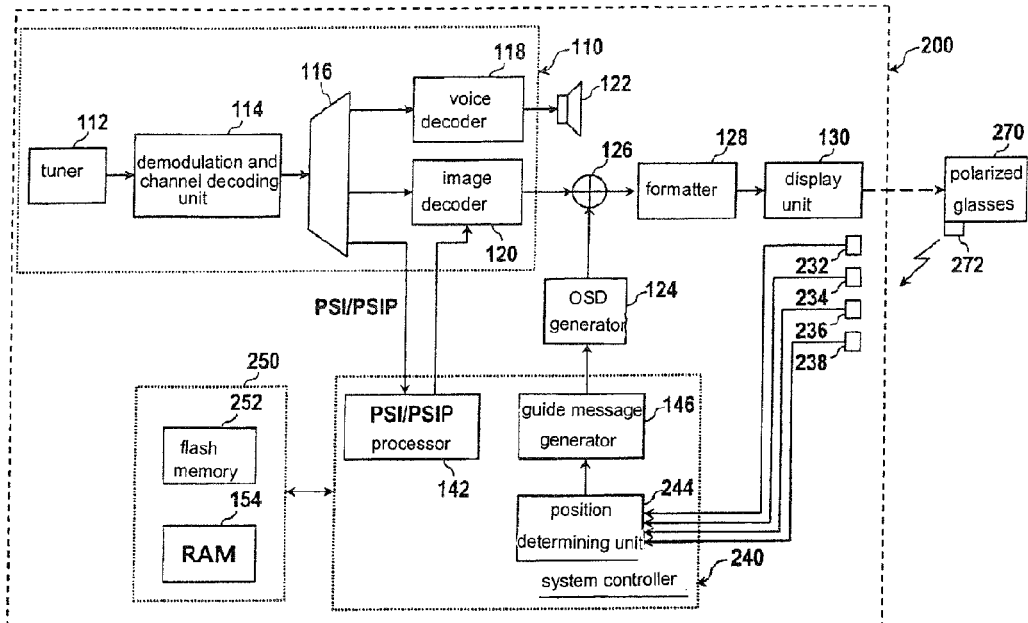
FIG. 10 is a block diagram of a TV receiver system according to a second embodiment of the present disclosure.

FIG. 10 is a block diagram of a TV receiver system according to a second embodiment of the present disclosure. The TV receiver system of FIG. 10 is provided with a TV receiver 200 and polarized glasses 270. The TV receiver 200 is configured to receive a 3D broadcasting signal through terrestrial airwaves or a cable TV network, and to display a 3D image corresponding to the 3D broadcasting signal in a stereoscopic manner. A polarizing filter having polarizing directions different from each other by 90° is attached to a display panel of the TV receiver 200, thereby polarizing a left image and a right image in different directions. The polarized glasses 270 are provided with a polarized pattern in the same manner as that of the polarizing filter of the display panel. This may allow only a left image to be input to a viewer's left eye, and may allow only a right image to be input to a viewer's right eye.

Figure 11:
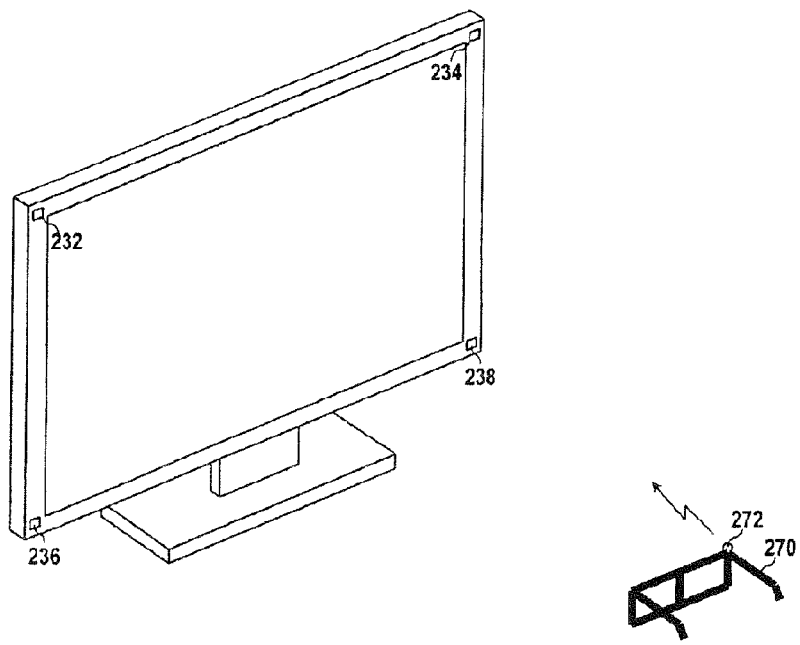
FIG. 11 is a perspective view showing installation positions of ultrasonic receivers of FIG. 10.

Differently from that the TV receiver 100 of FIG. 3 is provided with the image sensors 132 and 134, the TV receiver 200 of this embodiment is provided with four ultrasonic receivers 232~238. As shown in FIG. 11, the first to fourth ultrasonic receivers 232~238 are installed near four corners of a front surface of a frame which accommodates an LC panel therein. The first to fourth ultrasonic receivers 232~238 are configured to receive ultrasonic signals transmitted from the polarized glasses 270. The first to fourth ultrasonic receivers 232~238 are configured to restore a pulse string included in the ultrasonic signals, and to provide the pulse string to a system controller 240 so that the system controller 240 can determine a position of the polarized glasses 270 by the pulse string.

Figure 12:
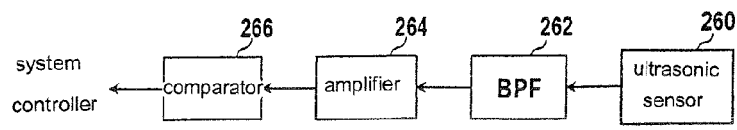
FIG. 12 is a detailed block diagram of the ultrasonic receivers of FIG. 10.

FIG. 12 is a block diagram of each of the ultrasonic receivers 232~238. Each ultrasonic receiver includes a ultrasonic sensor 260, a band-pass filter 260, an amplifier 264 and a comparator 266. The ultrasonic sensor 260 is configured to convert a ultrasonic signal into an electric reception signal. The band-pass filter 260 is configured to perform band-pass filtering with respect to an electric reception signal, and the amplifier 264 is configured to amplify a filtered signal. And, the comparator 266 is configured to output a pulse string by comparing an amplified signal with a reference voltage.

Figure 13:
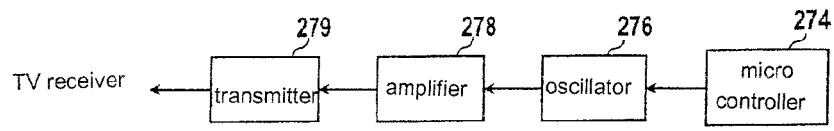
FIG. 13 is a detailed block diagram of a ultrasonic transmitter provided at polarized glasses of FIG. 10.

An ultrasonic transmitter 272 is disposed at one side of the polarized glasses 270. FIG. 13 is a view showing one embodiment of the ultrasonic transmitter 272. Referring to FIG. 13, the ultrasonic transmitter 272 includes a microcontroller 274, an oscillator 276, am amplifier 278 and a transmitter 279. The micro controller 274 is configured to generate a pulse string periodically or non-periodically. The oscillator 276 is configured to generate a high-frequency signal according to a pulse string generated from the micro controller 274. The amplifier 278 is configured to amplify a high-frequency signal generated from the oscillator 276. And, the transmitter 279 is configured to convert an amplified signal into an ultrasonic signal.

Figure 14:
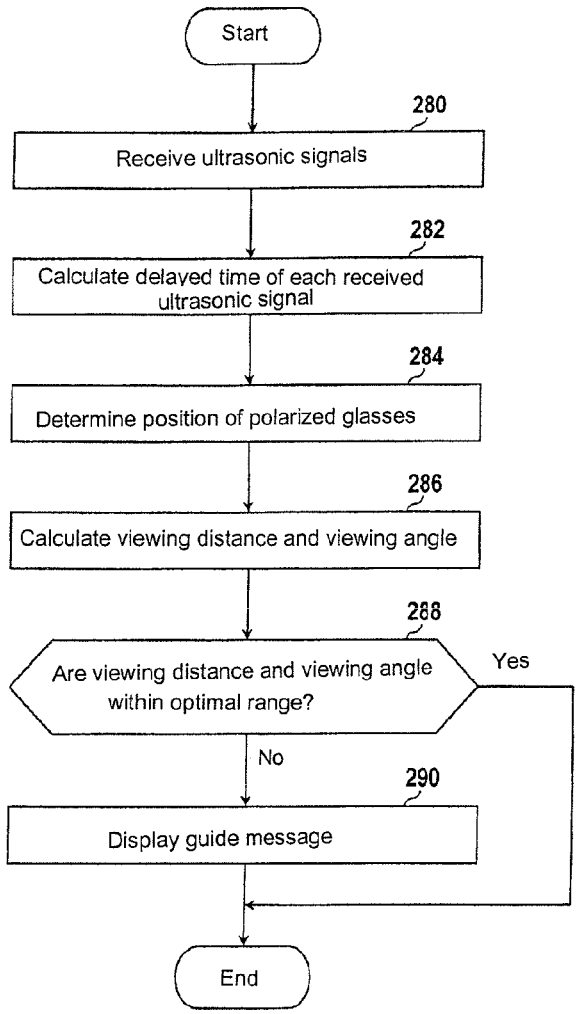
FIG. 14 is a flowchart showing an operation of the TV receiver system of FIG. 10.

FIG. 14 is a flowchart showing processes of notifying a viewing range in the TV receiver system of FIG. 10.

Figure 15:
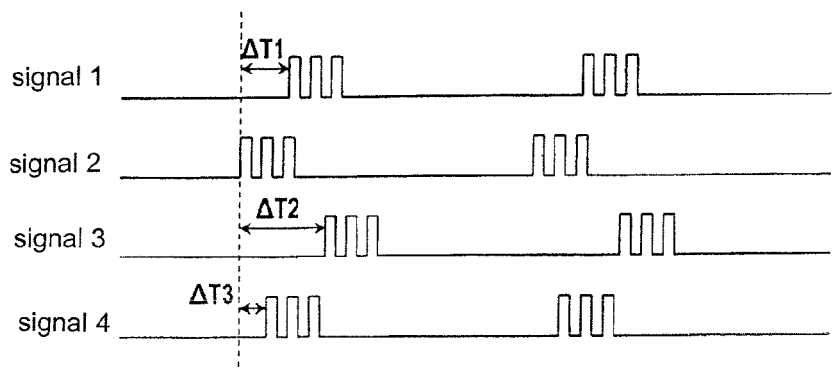
FIG. 15 is a view for explaining a delayed time of each received signal.

Firstly, the first to fourth ultrasonic receivers 232~238 disposed on a front surface of a display unit 130 receive ultrasonic signals transmitted from the ultrasonic transmitter 272 of the polarized glasses 270, and convert the received ultrasonic signals into an electric pulse string (S280). One example of the pulse string received by the first to fourth ultrasonic receivers 232~238 is shown in FIG. 15. Referring to FIG. 15, signal 1 indicates a signal received by the ultrasonic receiver 232, signal 2 indicates a signal received by the ultrasonic receiver 234, signal 3 indicates a signal received by the ultrasonic receiver 236, and signal 4 indicates a signal received by the ultrasonic receiver 238.

In S282, the position determining unit 244 of the system controller 240 calculates a delayed time of each received signal. As shown in FIG. 15, the delayed time is preferably calculated based on a firstly-received signal. In FIG. 15, first delayed time ($\Delta T1$) indicates a difference of reception times between the signal 2 and the signal 1, second delayed time ($\Delta T2$) indicates a difference of reception times between the signal 2 and the signal 3, and third delayed time ($\Delta T3$) indicates a difference of reception times between the signal 2 and the signal 4. In S284, the position determining unit 244 compensates for the delayed times ($\Delta T1, \Delta T2, \Delta T3$), by deducting a predetermined delayed time inside the TV receiver stored in the flash memory 252, from the delayed times. Then, the position determining unit 244 calculates distance differences between the first to fourth ultrasonic receivers 232~238 and the ultrasonic transmitter 272 of the polarized glasses 270. Each distance difference may be calculated as follows.

$$\Delta L = \Delta T' \cdot V \quad \text{[Equation 4]}$$
$$= \Delta T' \cdot (331.5 + 0.6t)$$

Here, 't' indicates an indoor temperature. The position determining unit 244 calculates a one-way distance difference by dividing each distance difference by two, thereby determining a position of the polarized glasses 270.

In S286, the position determining unit 244 calculates a viewing distance and a viewing angle of a viewer using the polarized glasses 270, based on data on the position of the polarized glasses 270 determined in S284. Then, the guide message generator 146 determines whether the calculated viewing distance is greater than an optimal viewing distance stored in the flash memory 252, and whether the calculated viewing angle is within an optimal viewing angle stored in the flash memory 252 (S288). If it is determined in S288 that the viewing distance and the viewing angle are within an optimal range, the processes of FIG. 14 are ended. On the other hand, if it is determined in S288 that the viewing distance and the viewing angle are not within an optimal range, the guide message generator 146 generates a guide message for advising the viewer to change the viewing position, and then provides the guide message to the OSD generator 124 so that the guide message can be displayed on an OSD (S290).

Figure 16:
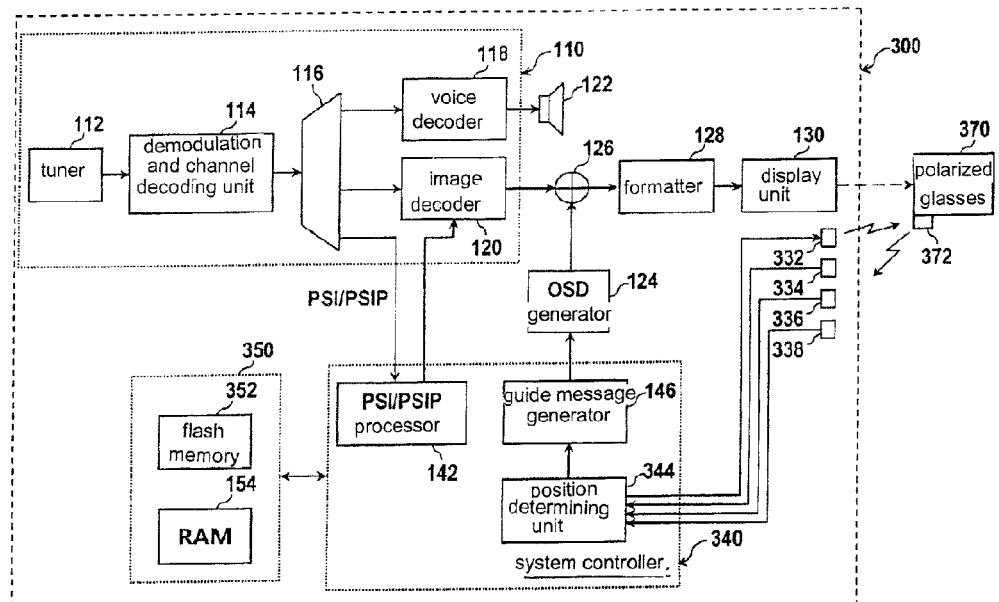
FIG. 16 is a block diagram of a TV receiver system according to a third embodiment of the present disclosure.

FIG. 16 is a block diagram of a TV receiver system according to a third embodiment of the present disclosure. The TV receiver system of FIG. 16 is provided with a TV receiver 300 and polarized glasses 370. The TV receiver 300 is configured to receive a 3D broadcasting signal through a terrestrial wave or a cable TV network, and to display a 3D image corresponding to the 3D broadcasting signal in a stereoscopic manner. A polarizing filter having polarizing directions different from each other by 90° is attached to a display panel of the TV receiver 300, thereby polarizing a left image and a right image to different directions. The polarized glasses 370 are provided with a polarization pattern in the same manner as the polarizing filter of the display panel. This may allow only a left image to be input to a viewer's left eye, and may allow only a right image to be input to a viewer's right eye.

Figure 17:
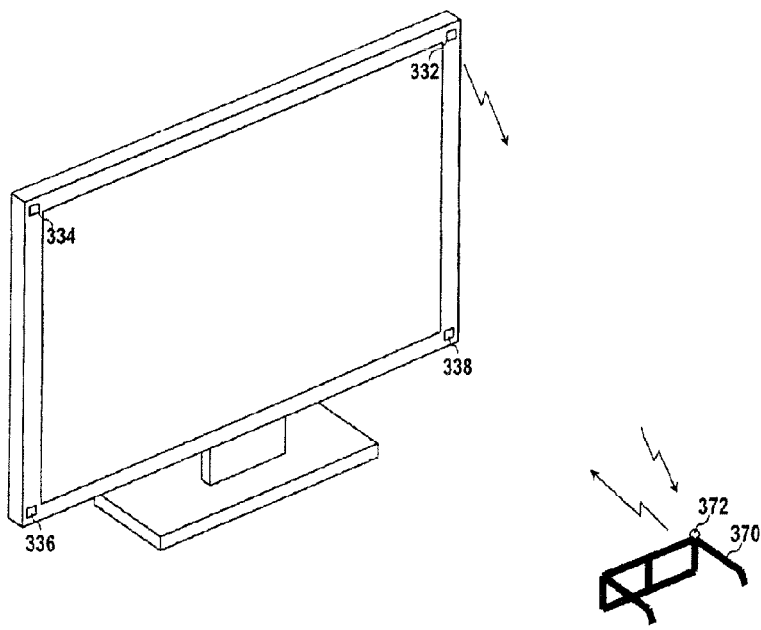
FIG. 17 is a detailed block diagram of a ultrasonic repeater provided at polarized glasses of FIG. 16.

The TV receiver 300 of this embodiment is provided with an ultrasonic transmitter 332, and three ultrasonic receivers 334~338. As shown in FIG. 17, in a preferred embodiment, the ultrasonic transmitter 332 and the three ultrasonic receivers 334~338 are installed near four corners of a front surface of a frame which accommodates an LC panel therein. The ultrasonic transmitter 332 is configured to transmit a ultrasonic signal, and the first to third ultrasonic receivers 334~338 are configured to receive ultrasonic signals transmitted from the ultrasonic transmitter 332 and relayed by the polarized glasses 370. The ultrasonic receivers 334~338 are configured to restore a pulse string included in the ultrasonic signals, and to provide the pulse string to a system controller 340 so that the system controller 340 can determine a position of the polarized glasses 370 by the pulse string. The ultrasonic transmitter 332 may have a similar configuration to that of FIG. 13, and each of the ultrasonic receivers 334~338 may have a similar configuration to that of FIG. 12.

Figure 18:
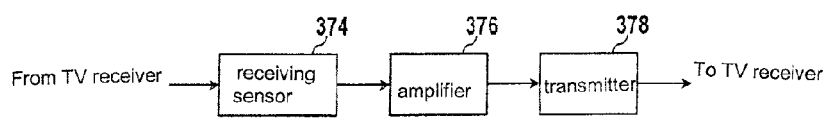
FIG. 18 is a perspective view showing installation positions of a ultrasonic transmitter and ultrasonic receivers of FIG. 16.

An ultrasonic repeater 372 is disposed at one side of the polarized glasses 370. FIG. 18 is a view showing one embodiment of the ultrasonic repeater 372. Referring to FIG. 18, the ultrasonic repeater 372 includes a receiving sensor 374, an amplifier 376 and a transmitter 378. The receiving sensor 374 is configured to receive a ultrasonic signal, and to convert the received ultrasonic signal into an electric reception signal. The amplifier 376 is configured to amplify an electric reception signal, and the transmitter 378 is configured to convert an amplified signal into a ultrasonic signal to transmit the ultrasonic signal to the TV receiver 300.

Figure 19:
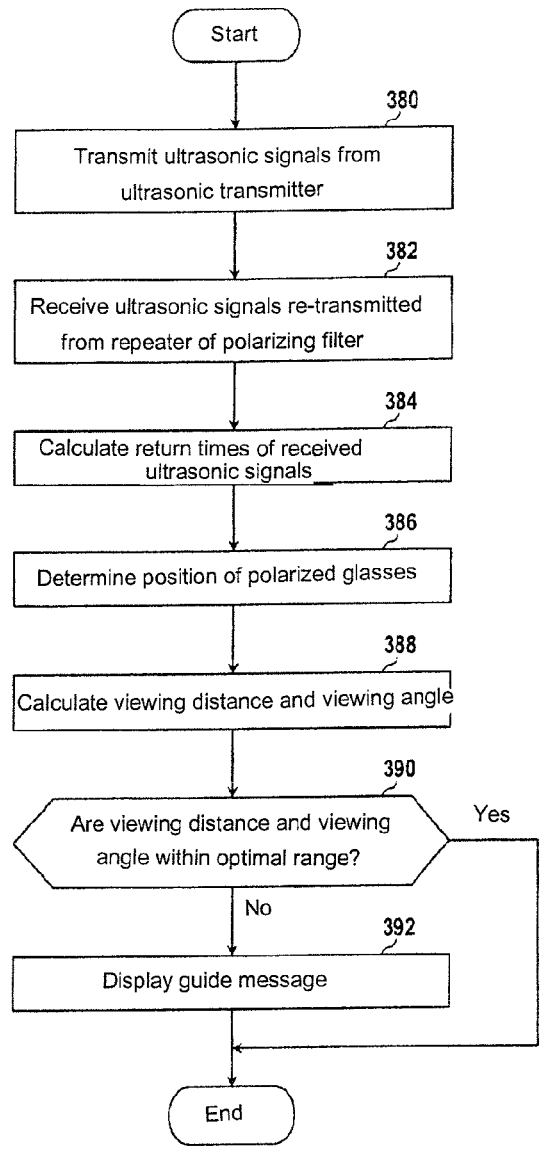
FIG. 19 is a flowchart showing an operation of the TV receiver system of FIG. 16.

FIG. 19 is a flowchart showing processes of notifying a viewing range in the TV receiver system of FIG. 16.

Firstly, a position determining unit 344 of the system controller 340 transmits ultrasonic signals from a front surface of the ultrasonic transmitter 332 periodically or non-periodically (S380). The transmitted ultrasonic signals are received by the ultrasonic repeater 372 of the polarized glasses 370, and then are re-transmitted to the TV receiver 300. The first to third ultrasonic receivers 334~338 disposed on a front surface of a display unit 130 of the TV receiver 300 receive the ultrasonic signals re-transmitted from the ultrasonic repeater 372 of the polarized glasses 370, and convert the received ultrasonic signals into an electric pulse string (S382).

Figure 20:
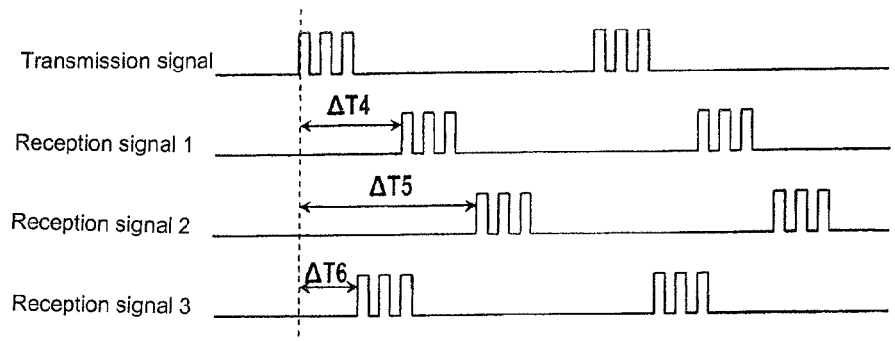
FIG. 20 is a view for explaining time taken for ultrasonic signals to be transmitted and then received in the TV receiver system of FIG. 16.

In S384, the position determining unit 344 of the system controller 340 calculates a return time taken for each transmitted ultrasonic signal to be received. As shown in FIG. 20, the return time corresponds to a difference between a transmission time when a signal has been transmitted from the ultrasonic transmitter 332, and a reception time when the signal has been received by each ultrasonic receiver 334~338. In S386, the position determining unit 344 compensates for return times ($\Delta T4$, $\Delta T5$, $\Delta T6$), by deducting a delayed time inside the TV receiver 300 and the polarized glasses 370 stored in a flash memory 352, from the calculated return times ($\Delta T4$, $\Delta T5$, $\Delta T6$). Then, the position determining unit 344 calculates one-way transmission times by dividing the compensated return times ($\Delta T4'$, $\Delta T5'$, $\Delta T6'$) by two. The position determining unit 344 calculates a distance between each ultrasonic receiver 334, 336 and 338 and the polarized glasses 370. Then, the position determining unit 344 determines a position of the polarized glasses 370.

In S388, the position determining unit 344 calculates a viewing distance and a viewing angle of a viewer using the polarized glasses 370, based on data on the position of the polarized glasses 370 determined in S384. Then, the guide message generator 146 determines whether the calculated viewing distance is greater than an optimal viewing distance stored in the flash memory 352, and whether the calculated viewing angle is within an optimal viewing angle stored in the flash memory 352 (S390). If it is determined in S390 that the viewing distance and the viewing angle are within an optimal range, the processes of FIG. 19 are ended. On the other hand, if it is determined that the viewing distance and the viewing angle are not within an optimal range, the guide message generator 146 generates a guide message for advising the viewer to change the viewing position, and then provides the guide message to the OSD generator 124 so that the guide message can be displayed on an OSD (S392).

INDUSTRIAL APPLICABILITY

Various concepts described in the present disclosure may be applied to a 3D TV receiver that employs polarized glasses. However, the present disclosure is not limited to this, but may be also applied to other types of stereoscopic 3D TV receiver systems. Furthermore, the present disclosure may be applied to a stereoscopic 3D display system and the like.

The invention claimed is:

1. In a three-dimensional (3D) TV receiver, a viewing range notification method, the method comprising:
   determining whether a viewing distance of a viewer is greater than or less than a particular distance, and whether a viewing angle is within a particular angular range; and
   providing a guide message to allow the viewer to change the viewer's viewing position if the viewing distance is determined to be greater than or less than the particular distance, or if the determined viewing angle is out of the particular angular range,
   wherein the step of determining comprises:
   receiving, via a plurality of ultrasonic receivers, ultrasonic signals transmitted from TV receiver glasses worn by the viewer,
   calculating a difference in transmission times for the ultrasonic signals transmitted to the plurality of ultrasonic receivers,
   determining the viewing position of the viewer based on the calculated difference in transmission times, and
   calculating the viewing distance and the viewing angle.

2. The method of claim 1, wherein the step of determining comprises:
   transmitting source ultrasonic signals;
   receiving, via the plurality of ultrasonic receivers, ultrasonic signals that are sent from the TV receiver glasses of the viewer upon receiving the source ultrasonic signals;
   calculating signal return times of the ultrasonic signals; and
   determining the viewing position of the viewer based on the calculated signal return times.

3. The method of claim 1, wherein the step of determining comprises:
   capturing an image of objects located in front of the 3D TV receiver by a plurality of image sensors; and
   determining the viewing position of the viewer based on the captured image.

4. The method of claim 3, wherein the step of determining the viewing position of the viewer comprises determining a position of the TV receiver glasses worn by the viewer.

5. A television (TV) signal receiver, comprising:
   a signal receiving unit configured to restore image signals after receiving broadcast signals;
   a plurality of ultrasonic receivers used together with TV receiver glasses having an ultrasonic transmitter, and configured to receive ultrasonic signals transmitted from the TV receiver glasses;
   a controller configured to determine whether a viewing distance of a user is farther than or nearer than a predetermined distance, and whether a viewing angle is within a predetermined angular range;
   a message screen generator configured to generate a guide message screen that allows the user to change the user's viewing position, if the viewing distance is farther than or nearer than the predetermined distance, or if the viewing angle is out of the predetermined angular range; and
   a signal coupling unit configured to couple an output of the guide message screen to an output of the image signals,
   wherein the controller comprises:
   a viewing range determining unit configured to determine the viewing distance and the viewing angle, wherein the viewing range determining unit is configured to determine the user's viewing position based on differences in transmission times for the ultrasonic signals transmitted to the plurality of ultrasonic receivers, and is configured to calculate the viewing distance and the viewing angle.

6. The TV signal receiver of claim 5, further comprising:
a memory configured to store therein a reference distance value and a reference angular range value.

7. The TV signal receiver of claim 6, further comprising:
a plurality of image sensors configured to capture an image of objects located in front of the TV signal receiver,
wherein the viewing range determining unit is configured to determine the user's viewing position based on the image captured by the plurality of image sensors.

8. The TV signal receiver of claim 6, further comprising:
an ultrasonic transmitter used together with the TV receiver glasses having an ultrasonic repeater, and configured to transmit source ultrasonic signals; and
the plurality of ultrasonic receivers configured to receive the ultrasonic signals re-transmitted from the TV receiver glasses,
wherein the viewing range determining unit is configured to determine the user's viewing position based on return times of the ultrasonic signals received by the plurality of ultrasonic receivers.

* * * * *